United States Patent
Kim (10) Patent No.: US 10,234,954 B2
(45) Date of Patent: Mar. 19, 2019

(54) APPARATUS AND METHOD FOR REMOTE CONTROL USING CAMERA-BASED VIRTUAL TOUCH

(71) Applicant: VTOUCH CO., LTD., Seoul (KR)

(72) Inventor: Seok-joong Kim, Seoul (KR)

(73) Assignee: VTOUCH CO., LTD, Seoul (KR)

( * ) Notice: Subject to any disclaimer, the term of this patent is extended or adjusted under 35 U.S.C. 154(b) by 0 days.

(21) Appl. No.: 15/120,664

(22) PCT Filed: Feb. 23, 2015

(86) PCT No.: PCT/KR2015/001703
§ 371 (c)(1),
(2) Date: Aug. 22, 2016

(87) PCT Pub. No.: WO2015/126197
PCT Pub. Date: Aug. 27, 2015

(65) Prior Publication Data
US 2017/0075427 A1    Mar. 16, 2017

(30) Foreign Application Priority Data
Feb. 22, 2014    (KR) .................. 10-2014-0020985

(51) Int. Cl.
*G06F 3/01* (2006.01)
*G06K 9/00* (2006.01)
*G06T 7/73* (2017.01)

(52) U.S. Cl.
CPC .............. *G06F 3/017* (2013.01); *G06F 3/013* (2013.01); *G06K 9/00355* (2013.01); *G06T 7/74* (2017.01); *G06T 2207/30196* (2013.01)

(58) Field of Classification Search
CPC ........ G06F 3/017; G06F 3/013; G06F 3/0304; G06F 3/011; G06F 3/044; G06T 7/74;
(Continued)

(56) References Cited

U.S. PATENT DOCUMENTS

| 6,531,999 B1 * | 3/2003 | Trajkovic | G06F 3/0304 345/157 |
| 2002/0097218 A1 * | 7/2002 | Gutta | G06F 3/0304 345/156 |

(Continued)

FOREIGN PATENT DOCUMENTS

| CN | 100363880 C | 1/2008 |
| CN | 103347437 A | 10/2013 |

(Continued)

OTHER PUBLICATIONS

English translation of 10-2010-0129629.
(Continued)

*Primary Examiner* — Richard J Hong
(74) *Attorney, Agent, or Firm* — Dinsmore & Shohl LLP; Yongsok Choi, Esq.

(57) ABSTRACT

A remote control apparatus comprises an image acquisition unit for acquiring an image of the body of a user by photographing the image, a location calculation unit for calculating coordinate data representing the locations of a first coordinate (eye) and a second coordinate (a finger or a pointer) of the body of the user by means of the image received from the image acquisition unit, and a match confirmation unit for checking whether the locations of the first and second coordinates of the body of the user match the extended connecting straight line, the coordinates having been confirmed on the basis of the camera lens-based coordinate data calculated in the location calculation unit, and if the match is confirmed, then concluding the setup intention of the user to be an affirmative.

10 Claims, 8 Drawing Sheets

(58) Field of Classification Search
CPC ...... G06T 2207/30196; G06K 9/00355; A63F 13/06
See application file for complete search history.

(56) References Cited

U.S. PATENT DOCUMENTS

| | | | | |
|---|---|---|---|---|
| 2005/0248529 | A1* | 11/2005 | Endoh | G06F 3/011 345/156 |
| 2011/0154266 | A1* | 6/2011 | Friend | A63F 13/06 715/863 |
| 2011/0267265 | A1* | 11/2011 | Stinson | G06F 3/017 345/157 |
| 2011/0296353 | A1* | 12/2011 | Ahmed | G06F 3/017 715/848 |
| 2012/0206333 | A1* | 8/2012 | Kim | G06F 3/013 345/156 |
| 2013/0321265 | A1* | 12/2013 | Bychkov | G06F 3/013 345/156 |
| 2013/0321347 | A1* | 12/2013 | Kim | G06F 3/017 345/175 |
| 2014/0184494 | A1* | 7/2014 | Burachas | G06F 3/012 345/156 |
| 2015/0130743 | A1* | 5/2015 | Li | G06F 3/044 345/174 |

FOREIGN PATENT DOCUMENTS

| | | |
|---|---|---|
| CN | 103370678 A | 10/2013 |
| EP | 1594040 A2 | 11/2005 |
| EP | 2677399 A2 | 12/2013 |
| JP | 2013-210723 | 10/2013 |
| KR | 10-2010-0129629 | 12/2010 |
| KR | 10-2012-0126508 | 11/2012 |
| KR | 10-2012-0136719 | 12/2012 |
| KR | 10-1235432 | 2/2013 |
| KR | 10-2013-0133482 | 12/2013 |
| WO | 2009083984 A2 | 7/2009 |

OTHER PUBLICATIONS

English translation of 10-1235432.
English translation of 10-2012-0126508.
English translation of 10-2012-0136719.
English translation of 10-2013-0133482.
English translation of 2013-210723.

* cited by examiner

APPARATUS AND METHOD FOR REMOTE CONTROL USING CAMERA-BASED VIRTUAL TOUCH

TECHNICAL FIELD

The present invention relates to an apparatus and method for a user to remotely control an electronic device, and in particular, to a camera-based remote control apparatus and method that may remotely control the operation of an electronic device using a virtual touch through a motion (gesture) of a user's fingertip with respect to the center of a camera.

DISCUSSION OF RELATED ART

Smartphone or other touch panel-equipped electronic devices are recently commonplace. Touch panel control eliminates the need of displaying a pointer on the screen as contrasted with existing mouse control for computers or others. To control a touch-controllable electronic device, the user may simply move and touch his finger on an icon on the screen without moving a cursor that is conventionally required for computers or other electronic devices. As such, touch panel technology enables quick control thanks to omission of cursor control.

Despite such advantageous, however, touch panel techniques require the user to directly touch the screen, rendering it unavailable for remote use. For remote control, touch-controllable electronic devices thus resort to other control devices, such as remote controllers.

Korean Patent Application Publication No. 2010-0129629 published on Dec. 9, 2010 (hereinafter, document 1) discloses a remote electronic device controller capable of generating a point at a precise position. According to the technique, two cameras are used to capture an image ahead of the display and generate a point at the spot where the extension line of the user's eye and finger meets the screen. However, such is very inconvenient in that a pointer should be inevitably generated by a pointer controller as a preliminary step for controlling the electronic device before the user's gesture is compared with a pre-stored pattern for specific operation.

Further, according to document 1, in order to detect the spot where the extension line of the user's eye and finger meets the screen, three-dimensional (3D) spatial coordinates are produced through 3D coordinates calculation. In this case, each of the user's eye, finger, and selection point for operation control should be detected through images captured by camera at different positions. Thus, it is difficult to precisely detect selection points, and detection of more precise selection points may increase the load of calculation.

Moreover, remote electronic device control by the reference technique is limited to electronic devices equipped with a large-screen display, e.g., large enough for control icons to be noticeable to the user positioned away therefrom. Thus, remote control is possible only on the front surface of the electronic device, and the user should be positioned in front of the front of the electronic device for control.

Further, operation control of an electronic device is performed by communication with a camera controller, and for remote control, the electronic device should be located at a fixed position. This limits the application to only stationary electronic devices.

PRIOR TECHNICAL DOCUMENTS

Korean Patent Application Publication No. 10-2010-0129629, titled "Method for controlling operation of electronic device by motion detecting and electronic device adopting the same."

Korean Patent No. 10-1235432, titled "Remote control apparatus and method using 3D modeled virtual touch of electronic device."

SUMMARY

The present invention has been conceived to address the above issues and aims to provide a camera-based, virtual touch-adopted remote control apparatus and method that may control the operation of an electronic device using a remote virtual touch through a motion (gesture) of a user's finger by performing a dominant eye setting using a camera whose center is in line with an extension line of the user's eye and finger.

Another object of the present invention is to provide a remote control apparatus and method capable of remotely controlling an electronic device located anywhere in a home using a virtual touch through a motion (or gesture) of a user's fingertip regardless of motion of the electronic device or position and direction between the user and electronic device.

Other objects of the present invention are not limited to the foregoing objects, and other objects will be apparent to one of ordinary skill in the art from the following detailed description.

To achieve the above objects, according to the present invention, a remote control device using a camera-based virtual touch comprises an image obtaining unit obtaining an image of a user's body through image capturing; a position calculator calculating coordinate data indicating positions of first coordinates (an eye) and second coordinates (a finger or pointer) of the user's body using the image received from the image obtaining unit- and a matching identifier identifying whether the positions of the first coordinates and the second coordinates of the user body identified based on the coordinate data produced by the position calculator with respect to a camera lens match an extension line, and if matching, determining that the user has a setting intention.

Preferably, the coordinate data produced by the position calculator is two-dimensional (2D) or three-dimensional (3D) data and is coordinate data at a position viewed from the camera lens of the image obtaining unit.

Preferably, the remote control device further comprises a virtual touch setting unit determining that the user has the setting intention if the matching is identified by the matching identifier, determining whether there is a variation in the coordinate data of the first and second coordinates, and performing an operation set to correspond to varied contact coordinate data; and a driving controller, if a command code generated from the virtual touch setting unit is inputted, converting the command code into a control command signal for controlling driving of a corresponding electronic device, and sending the control command signal to the electronic device.

Preferably, the virtual touch setting unit includes a gesture detector, if the matching is identified by the matching identifier, detecting the variation in the coordinate data of the first and second coordinates obtained by the image obtaining unit and detecting the user's finger motion (gesture), an electronic device detector comparing electronic device information previously stored in an electronic device information database (DB) based on the gesture detected by the gesture detector to detect the corresponding electronic device, an electronic device setting unit setting a control signal according to control of driving of the electronic device detected based on the gesture detected by the gesture detector, and a virtual touch processor generating a command code for controlling driving of the electronic device based on the control signal set by the electronic device setting unit.

Preferably, the electronic device information DB stores product information including the manufacturer and model name of electronic devices provided in the home, protocol information applied to the control of operation of each device, and control method information per device.

Preferably, the control command signal sent from the electronic device driving controller is sent through a short-range wireless communication scheme including an infrared (IR) signal, Wi-Fi, or Bluetooth.

Preferably, a remote control method using a camera-based virtual touch, comprising the steps of (A) calculating coordinate data using an image captured and received to obtain positions of first coordinates (an eye) and second coordinates (a finger or pointer) of a user's body.

(B) identifying whether the obtained first and second coordinates of the user's body match an extension line with respect to a camera lens, (C) if matching, detecting a variation in the obtained coordinate data of the first and second coordinates to detect the users motion (gesture).

(D) if the matching is identified, immediately determining that the user has a setting intention to perform a dominant eye setting distinctively for the dominant eye setting.

Preferably, a remote control method using a camera-based virtual touch, comprising the steps of (a) calculating coordinate data using an image captured and received to obtain positions of first coordinates (an eye) and second coordinates (a finger or pointer) of a user's body, (b) identifying whether the obtained first and second coordinates of the user's body match an extension line with respect to a camera lens, (c) if matching, detecting a variation in the obtained coordinate data of the first and second coordinates to detect the user's motion (gesture).

(d) generating a control command signal for controlling driving of an electronic device based on the detected motion of a finger and sending the control command signal to the electronic device.

Preferably, the coordinate data is two-dimensional (2D) or three-dimensional (3D) data and is coordinate data at a position viewed from the camera lens.

Preferably, step (d) includes the steps of (d1) comparing electronic device information previously stored in an electronic device information database (DB) based on the detected gesture by performing the dominant eye setting and a consecutive operation to detect a corresponding electronic device and to set an electronic device to be controlled for operation through a virtual touch, (d2) setting a control signal according to control of driving of the electronic device set through the user's motion (gesture) detected based on the 2D or 3D coordinate data, (d3) converting into a control command signal for controlling of driving of the electronic device based on the set control signal and generating a control command code for a corresponding electronic device, (d4) converting the generated command code into a control command signal for controlling operation of the electronic device and sending the control command signal to the electronic device.

Preferably, step (d2) includes setting the second coordinates (finger or pointer) of the user moving in at least one direction of up, down, left, and right with respect to the extension line of the camera lens, the first coordinates (eye), and the second coordinates (finger or pointer) as a control signal indicating selection or control of a particular icon displayed on a display unit or a motion of a joystick, setting the second coordinates of the user moving along a straight line from left to right (or from right to left) or from down to up (or from up to down) with respect to the extension line of the camera lens, the first coordinates (eye), and the second coordinates (finger or pointer) as a control signal for controlling a left-to-right turn-on/off switch or up-to-down turn-on/off switch, and setting the second coordinates of the user moving along a curved line from down to up (or from up to down) with respect to the extension line of the camera lens, the first coordinates (eye), and the second coordinates (finger or pointer) as a control signal for controlling a degree of rotation for adjusting a magnitude through a rotating wheel.

Preferably, the control command signal sent in step (d4) is sent through a short-range wireless communication scheme including an infrared (IR) signal, Wi-Fi, Bluetooth, or ZigBee.

As described above, according to the present invention, the camera-based remote control apparatus and method using a virtual touch has the following effects.

First, a dominant eye setting is performed using a camera whose center is in line and meets an extension line of an eye and finger, allowing for easy and precise locating a touch point in line with the extension line of the eye and finger. Thus, a motion (gesture) of the users fingertip may be detected precisely and quickly.

Second, a particular electronic device may be rapidly controlled in such a manner as a virtual touch on the camera rather than virtually touching a control icon displayed on the display device using a pointer through the display device. Thus, the present invention may be applicable to all other electronic devices than those with no display device.

Third, research efforts for use of virtual touch so far have been limited to only applications using display devices. The present invention may provide a brand-new touch recognition scheme enabling precise control of electronic devices and use for virtual touch devices not equipped with a display.

Fourth, a remote virtual touch may be provided for devices requiring simple control through switching, such as curtains, lighting, or automatic door locks, as well as electronic devices to perform control corresponding to the virtual touch, allowing for various applications.

BRIEF DESCRIPTION OF THE DRAWINGS

FIG. 3a is a view illustrating an image captured when they match each other in the process shown in FIG. 2a;

FIG. 3b is a view taken at a user's view when they match each other in the process shown in FIG. 2a;

DESCRIPTION OF EXEMPLARY EMBODIMENTS

Other objectives, features, and advantages of the present invention will be apparent by a detailed description of embodiments taken in conjunction with the accompanying drawings.

A remote control apparatus and method using a camera-based virtual touch according to the present invention are described below in preferred embodiments thereof. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The configurations disclosed in the specification and the drawings are mere examples and do not overall represent the technical spirit of the present invention. Therefore, various changes may be made thereto, and equivalents thereof also belong to the scope of the present invention.

Figure 1:
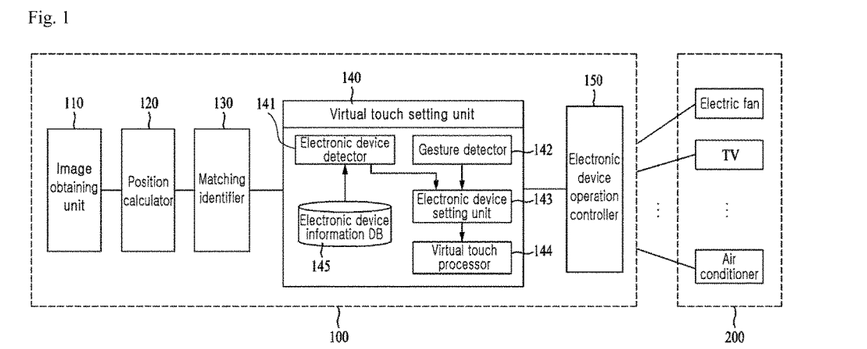
FIG. 1 is a block diagram illustrating a configuration of a remote control apparatus using a camera-based virtual touch according to an embodiment of the present invention.

FIG. 1 is a block diagram illustrating a configuration of a remote control apparatus using a camera-based virtual touch according to an embodiment of the present invention.

As shown in FIG. 1, the remote control apparatus 100 includes an image obtaining unit 110, a position calculator 120, a matching identifier 130, a virtual touch setting unit 140, and an electronic device operation controller 150.

The image obtaining unit 110 may be a camera module, and the image obtaining unit 110 may include an image sensor, such as CCD or CMOS, which may detect an image and convert the detected image into an electrical image signal.

The position calculator 120 produces coordinate data indicating the position of a user's body, i.e., first coordinates (eye) and second coordinates (finger and pointer) using an image received from the image obtaining unit 110. The produced coordinate data is two dimensional (2D) or three-dimensional (3D) coordinate data and indicates coordinate data at a position viewed from a camera lens of the image obtaining unit 110.

Further, a finger among the user's body portions used to produce the coordinate data is a portion enabling accurate and sophisticate control. Accordingly, according to the present invention, it is very effective to use a tip of a thumb and/or index finger as first coordinate data. In the same point of view, the fingertip playing a role as the first coordinate data may be replaced with a pointer (e.g., a pen) with a sharp tip which is grasped by fingers. According to the present invention, only a center point of an eye of the user is used as second coordinate data. For example, if the user places and views his index finger before his eye, he will see the finger double. This happens because the user's eyes see different shapes of the index finger (due to an angular difference between both eyes of the user). However, the user will clearly see the index finger at only one eye. Further, if looking at the index finger intentionally with only one eye, the user may clearly see the index finger even not closing the other eye. This is why aiming is done with one eye closed in shooting, archery, or other sports requiring a high-level accuracy. The present invention adopts such principle that viewing a finger (first coordinates) or pointer tip (second coordinates) with only one eye allows its shape to be shown more clearly.

The matching identifier 130 identifies whether the position of the user's body portions, i.e., eye and finger, identified based on the coordinate data produced by the position calculator 120, matches an extension line with respect to the center of the camera lens. Such identification by the matching identifier 130 as to whether the position of the eye and finger image-captured by the camera matches the extension line may vest more clarity in analysis of captured images.

If such matching is identified by the matching identifier 130, the virtual touch setting unit 140 determines that the user has a setting intention, and the virtual touch setting unit 140 determines whether the coordinate data of the eye and finger is varied and performs a set operation to correspond to varied contact coordinate data.

To that end, the virtual touch setting unit 140 includes a gesture detector 142 that, when the matching is identified by the matching identifier 130, detects a variation in the coordinate data of the eye and finger obtained from the image obtaining unit 110 and detects a motion (gesture) of the user's finger, an electronic device detector 141 that performs comparison with electronic device information previously stored in an electronic device information database (DB) 145 based on the gesture detected by the gesture detector 142 to detect a corresponding electronic device, an electronic device setting unit 143 that sets a control signal according to control of an operation of the electronic device detected based on the gesture detected by the gesture detector 142, and a virtual touch processor 144 that generates a command code for controlling the operation of a corresponding electronic device 200 based on the control signal set by the electronic device setting unit 143.

The electronic device information DB 145 stores product information including the manufacturer and model name of electronic devices provided in the home, protocol information applied to the control of operation of each device, and control method information per device. The control method information refers to information, such as a motion of the user's finger and position of a touch, for controlling or adjusting the power of the electronic device, illuminance, sound volume, or temperature by a virtual touch. For reference, the information stored in the electronic device information DB 150 may be frequently updated by the user after purchase of the electronic device, and such update may be performed by, e.g., accessing a website for the electronic device to download information on the electronic device or downloading information on the electronic device through, e.g., a transmitter included in the electronic device. Various embodiments may be possible within the technical spirit of the present invention.

Accordingly, as a dominant eye setting is performed using the camera through the virtual touch setting unit 140, the position of the eye and finger in line with the extension line and varied may be easily computed, and thus, the motion (gesture) of the user's finger tip may be detected more rapidly and accurately.

Upon input of the command code generated by the virtual touch setting unit 140, the electronic device operation controller 150 converts the command code into a control command signal for controlling the operation of the electronic device 200 and sends the control command signal to the electronic device 200. The control command signal may be preferably sent as an infra red (IR) signal as by a conventional remote controller, but is not limited thereto. For example, the control command, signal may be sent through wireless fidelity (Wi-Fi), Bluetooth, Zigbee, or other short-range wireless communication schemes.

The electronic device 200 which is under the remote control according to the present invention may include various electronic devices configuring a home network, such as a lamp, speaker, air conditioner, electric fan, blind, window, curtain, heater, gas oven, or microwave oven, video player, camera, or CCTV.

As such, the remote control apparatus 100 is separately installed from an electronic device that is subjected to remote control, and thus, even when the electronic device is on the move, computation of varied 3D spatial coordinates of the electronic device may be seamlessly done and may be applied to various mobile electronic devices.

Operation of a remote control apparatus using a camera-based virtual touch according to the present invention as configured above is described below in detail with reference to the accompanying drawings. The same reference numeral as that shown in FIG. 1 denote the same element performing the same function.

Figure 10:
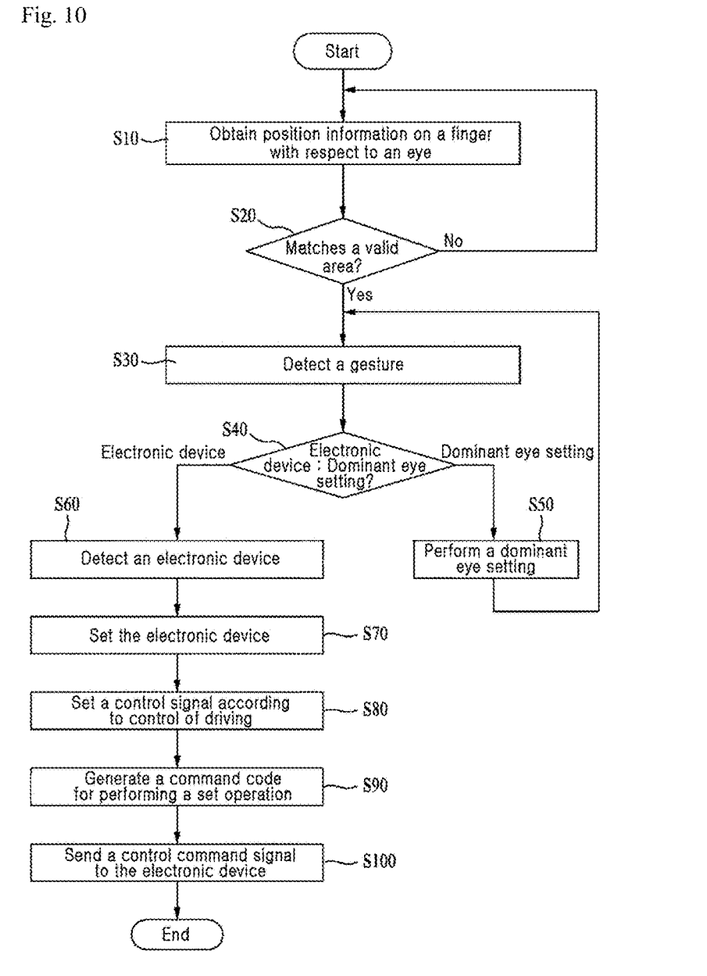
FIG. 10 is a flowchart illustrating a remote control method using a camera-based virtual touch according to an embodiment of the present invention.

FIG. 10 is a flowchart illustrating a remote control method using a camera-based virtual touch according to an embodiment of the present invention.

Referring to FIG. 10, coordinate data using an image captured and received from the image obtaining unit 110 is produced, and position information on the user's finger with respect to the user's eye is obtained (S10). The produced coordinate data is two-dimensional (2D) or three-dimensional (3D) coordinate data and indicates coordinate data at a position viewed from a camera lens of the image obtaining unit 110.

Figure 2A:
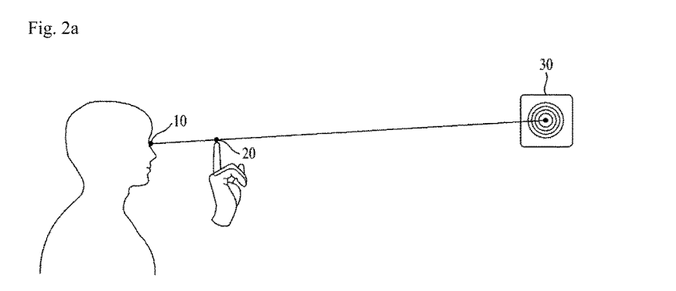
FIGS. 2a and 2b are views illustrating a process for identifying whether a user's eye and finger match each other in position on an extension line as shown in FIG. 10.
Figure 2B:
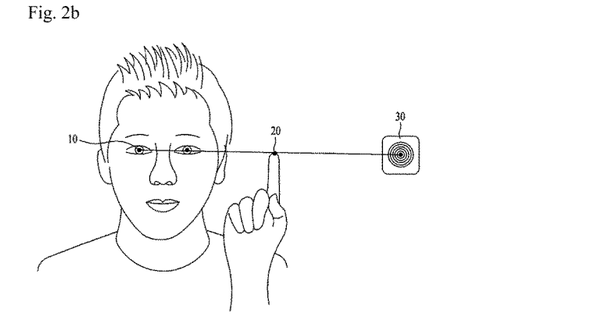
Figure 3A:
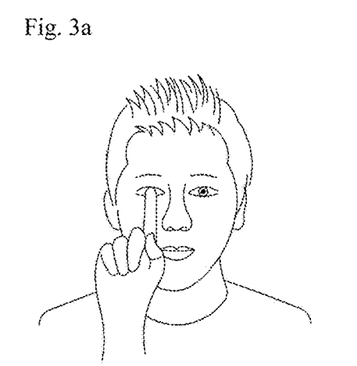
Figure 3B:
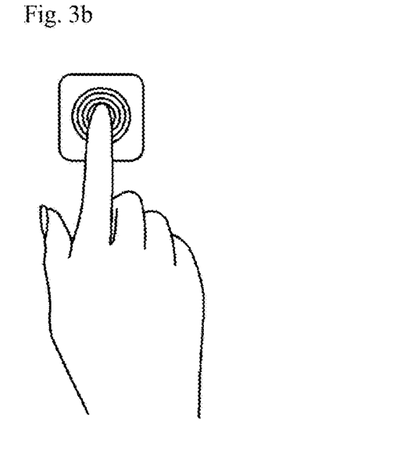

Subsequently, the matching identifier 130 is used to identify whether the position of the user's body portion, e.g., a finger, identified based on the coordinate data produced by the position calculator 120 with respect to the camera lens 30, matches a valid area with respect to the user's eye (S20). The matching may include when the user's eye 10 is in line with the user's hand 20 or when the user's hand 20 is positioned adjacent to the user's eye 20 as shown in FIGS. 2a and 2b. In other words, the valid area for the position of the user's hand 20 may be varied depending on the user's control intention. FIG. 3a is a view illustrating an image captured by the image obtaining unit 110 when the matching is attained, and FIG. 3b is a view taken at the user's view when the user selects a camera lens.

If the matching is identified to be achieved (S20), a variation in the coordinate data of the eye and finger image-captured by a camera, which is the image obtaining unit 110, is detected to detect the user's finger motion (gesture) (S30).

It is determined whether the detected finger motion is a gesture for dominant eye setting or a gesture for controlling an electronic device (S40). In step S40, only whether the finger motion is a gesture for dominant eye setting or not may be determined excluding the determination as to whether the finger motion is a gesture for controlling an electronic device. Here, the gesture for dominant eye setting includes a case where the user makes no finger motion.

If the finger motion is a gesture for dominant eye setting, a dominant eye setting is performed (S50). As such, according to the present invention, matching or not is identified through an extension line of the eye and finger image-captured by the camera, and a dominant eye setting is carried out. Thus, unlike in the conventional method where a finger motion (gesture) is detected through 3D coordinates to perform a dominant eye setting in identifying matching or not through an obtained image, easier or clearer analysis of captured images may be achieved along with a quick dominant eye setting. As such, when the present invention is used for the purpose of dominant eye setting for controlling various electronic devices, the whole process may end in step S50.

Subsequently, comparison may be made with electronic device information previously stored in the electronic device information DB 145 based on the gesture detected in an operation subsequent to performing a dominant eye setting to thereby detect a corresponding electronic device (S60), and an electronic device 200 is set whose operation is to be controlled through a virtual touch (S70).

Set is a control signal as per control of the operation of the electronic device detected based on the detected gesture (S80). There may be various embodiments of methods for controlling the operation of the electronic device according to the detected gesture.

Figure 4A:
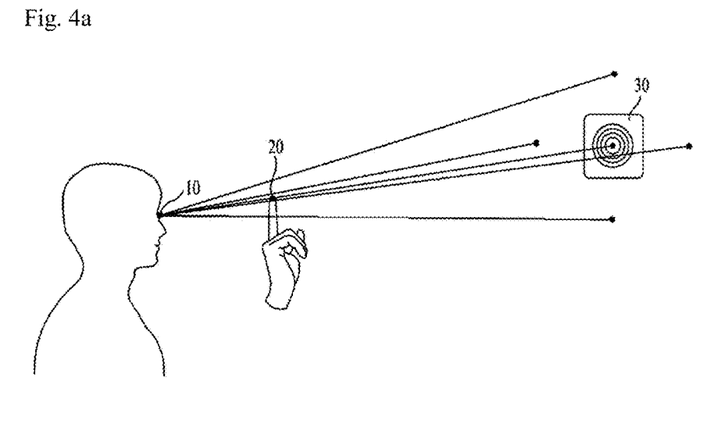
FIGS. 4a to 4c and FIG. 5 are views illustrating a first embodiment of a method for controlling an operation of an electronic device by a gesture detected.
Figure 4B:
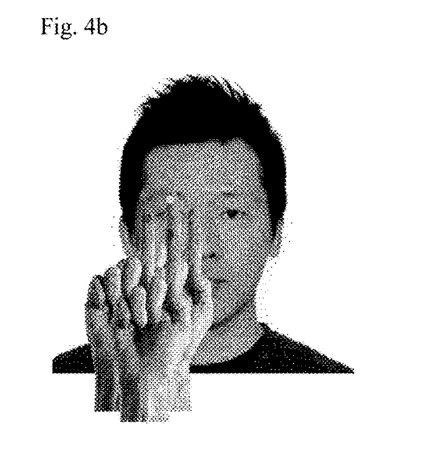
Figure 4C:
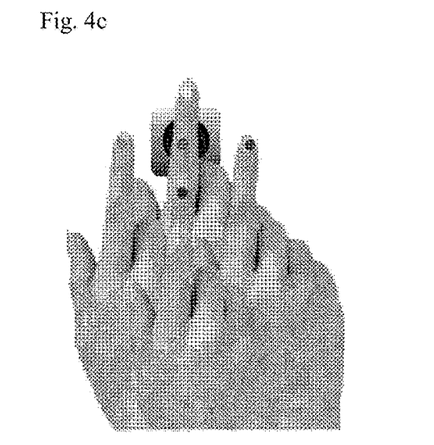

According to a first embodiment, an example may be taken in which the user's finger moves up, down, left, or right with respect to the extension line of the camera lens 30, eye 10, and finger 20, as shown in FIGS. 4a and 4b. FIG. 4b is a view illustrating an image captured by the image obtaining unit 110, and FIG. 4c is a view taken at the user's view.

Figure 5:
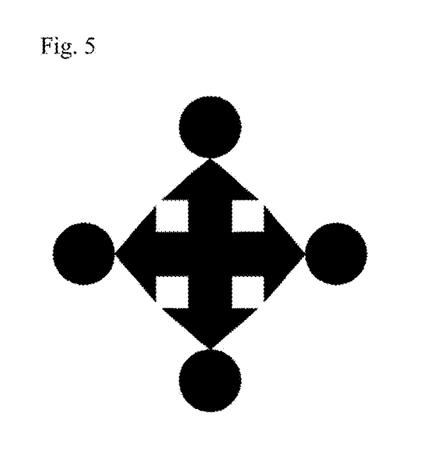

In the first embodiment, as shown in FIG. 5, a control signal as per control of a motion of a joystick may be set. As shown in FIG. 4b, which angle of up, down, left, and right and center of a click wheel is indicated may be easily and accurately detected only with an image obtained by the image obtaining unit 110.

Figure 6A:
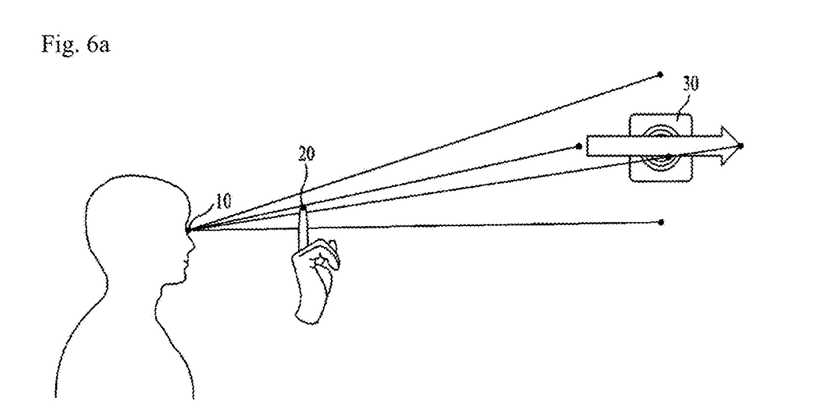
FIGS. 6a to 6d are views illustrating a second embodiment of a method for controlling an operation of an electronic device by a gesture detected.
Figure 6B:
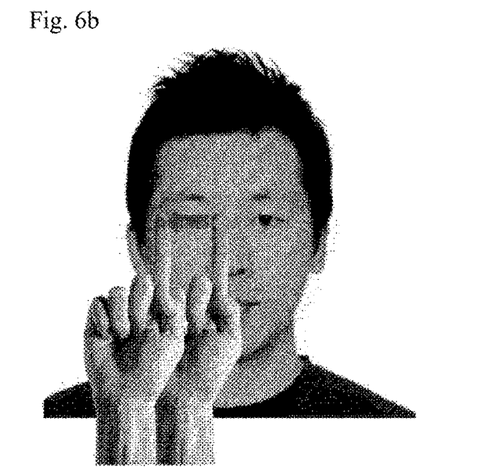
Figure 6C:
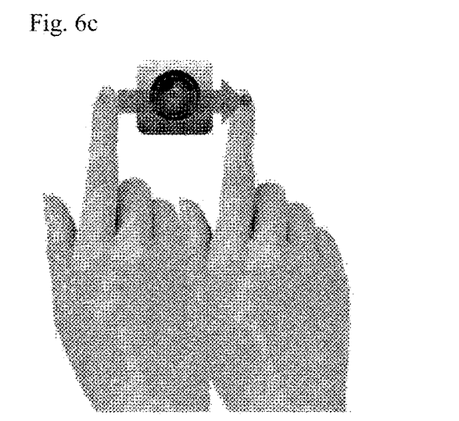

According to a second embodiment, an example may be taken in which the user's finger moves left to right (or right to left) along a straight line with respect to the extension line of the camera lens 30, eye 10, and finger 20, as shown in FIGS. 6a to 6c. FIG. 6b is a view illustrating an image captured by the image obtaining unit 110, and FIG. 6c is a view taken at the user's view.

Figure 6D:
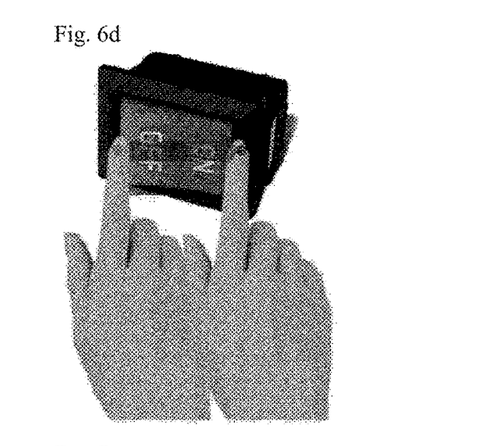

In the second embodiment, as shown in FIG. 6d, a control signal as per control of the switching of a switch for turning on/off left or right be set.

Figure 7A:
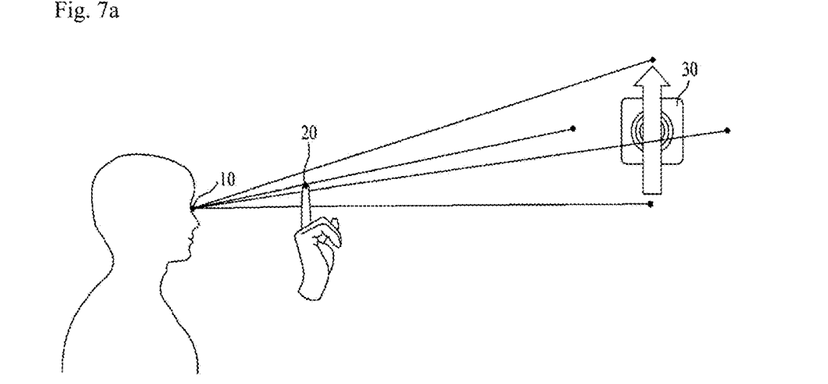
FIGS. 7a to 7c are views illustrating a third embodiment of a method for controlling an operation of an electronic device by a gesture detected.
Figure 7B:
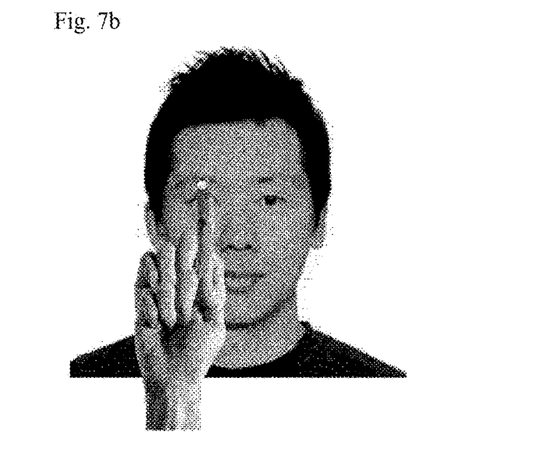

According to a third embodiment, an example may be taken in which the user's finger moves down to up (or up to down) along a straight line with respect to the extension line of the camera lens 30, eye 10, and finger 20, as shown in FIGS. 7a to 7b. FIG. 7b is a view illustrating an image captured by the image obtaining unit 110.

Figure 7C:
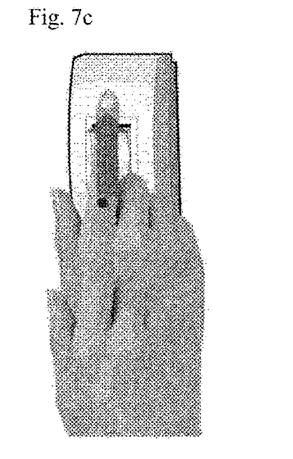

In the third embodiment, as shown in FIG. 7c, a control signal as per control of the switching of a switch for turning on/off up or down be set.

Figure 8A:
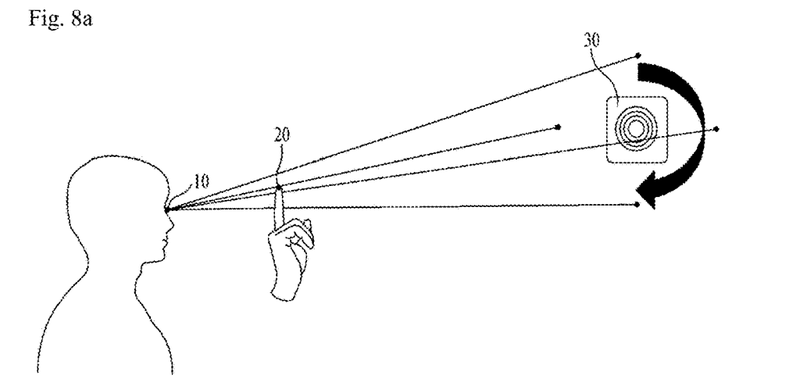
FIGS. 8a to 8c are views illustrating a fourth embodiment of a method for controlling an operation of an electronic device by a gesture detected.
Figure 8B:
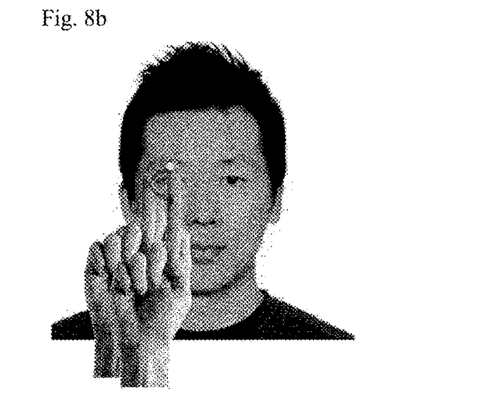

According to a fourth embodiment, an example may be taken in which the user's finger moves down to up (or up to down) along a curved line with respect to the extension line of the camera lens 30, eye 10, and finger 20, as shown in FIGS. 8a to 8b. FIG. 8b is a view illustrating an image captured by the image obtaining unit 110.

Figure 8C:
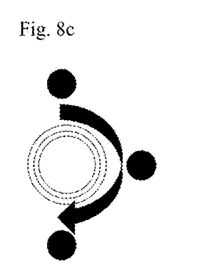

In the fourth embodiment, as shown in FIG. 8c, a control signal as per control of the degree of rotation for adjusting the sound volume or magnitude of a rotation wheel be set.

Figure 9A:
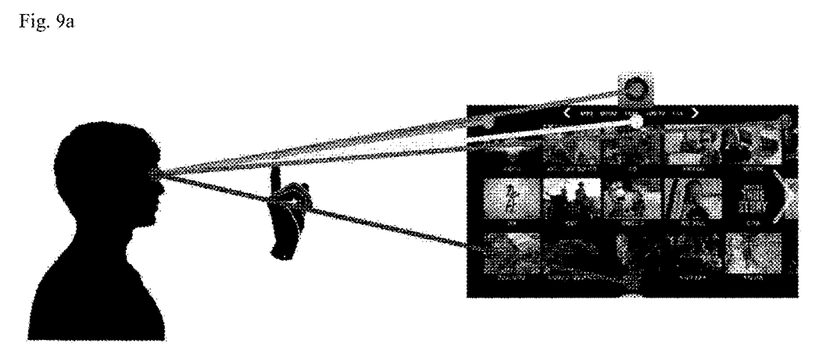
FIGS. 9a to 9c are views illustrating a fifth embodiment of a method for controlling an operation of an electronic device by a gesture detected.
Figure 9B:
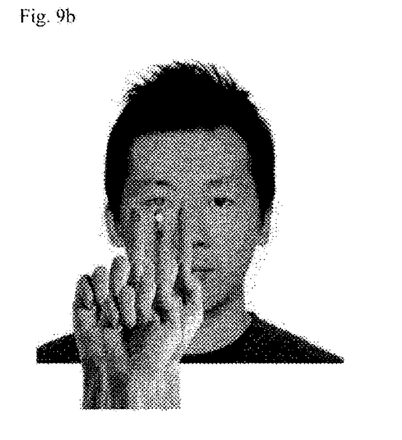
Figure 9C:
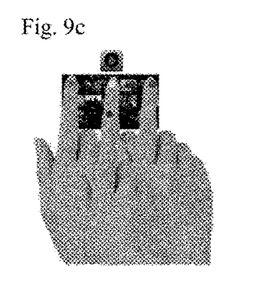

Use of the first to fourth embodiments enables selection or control of a particular icon displayed on a display of an electronic device, such as a TV, as shown in FIGS. 9a to 9c.

As such, the operation of an electronic device may be easily remote-controlled using a virtual touch through the motion (gesture) of the user's finger tip based on 2D or 3D coordinate data in the position where the user's finger is viewed from the camera lens of the image obtaining unit 110 with respect to the extension line of the camera lens 30, eye 10, and finger 20.

Conversion into a control command signal for controlling the operation of the electronic device is made based, on a control signal set through the motion (gesture) of the user's finger tip based on the 2D or 3D coordinate data, thereby generating a control command signal for a corresponding electronic device (S90).

The generated command code is converted into a control command signal for controlling the operation of the corresponding electronic device and is sent to the electronic device (S100). The control command signal may be preferably sent as an infra red (IR) signal as by a conventional remote controller, but is not limited thereto. For example, the control command signal may be sent through wireless fidelity (Wi-Fi), Bluetooth, Zigbee, or other short-range wireless communication schemes.

It should be noted that although the technical spirit of the present invention has been described in connection with preferred embodiments thereof, this is merely for description purposes and should not be interpreted as limiting. It should be appreciated by one of ordinary skill in the art that various changes may be made thereto without departing from the technical spirit of the present invention. Accordingly, the scope of the present invention should be determined by the technical spirit of the invention as claimed in the claims.

What is claimed is:

1. A remote control apparatus using a camera-based virtual touch, comprising:
   an image obtaining unit obtaining two-dimensional (2D) image of a user's body through image capturing;
   a position calculator calculating coordinate data indicating positions of first coordinates (an eye) and second coordinates (a finger or pointer) of the user's body on the 2D image of the user's body using the 2D image received from the image obtaining unit; and
   a matching identifier determining whether the coordinate data indicating the positions of the first coordinates of the user's body is substantially identical to the coordinate data indicating the position of the second coordinates of the user's body, and determining that the user has a setting intention in response to determination that the coordinate data indicating the position of the first coordinates of the user's body is substantially identical to the coordinate data indicating the position of the second coordinates of the user's body,
   wherein the coordinate data produced by the position calculator is two-dimensional (2D) data and is coordinate data at a position viewed from a camera lens of the image obtaining unit.

2. The remote control apparatus of claim 1, further comprising:
   a virtual touch setting unit determining that the user has the setting intention if the matching is identified by the matching identifier, determining whether there is a variation in the coordinate data of the first and second coordinates, and performing an operation set to correspond to varied contact coordinate data; and
   a driving controller, if a command code generated from the virtual touch setting unit is inputted, converting the command code into a control command signal for controlling driving of a corresponding, electronic device, and sending the control command signal to the electronic device.

3. The remote control apparatus of claim 2, wherein the control command signal sent from the driving controller is sent through a short-range wireless communication scheme including an infrared (IR) signal, WiFi, Bluetooth, or Zigbee.

4. The remote control apparatus of claim 1, wherein the virtual touch setting unit includes a gesture detector, if the matching is identified by the matching identifier, detecting the variation in the coordinate data of the first and second coordinates obtained by the image obtaining unit and detecting the user's finger motion (gesture), an electronic device detector comparing electronic device information previously stored in an electronic device information database (DB) based on the gesture detected by the gesture detector to detect the corresponding electronic device, an electronic device setting unit setting a control signal according to control of driving of the electronic device detected based on the gesture detected by the gesture detector, and a virtual touch processor generating a command code for controlling driving of the electronic device based on the control signal set by the electronic device setting unit.

5. The remote control apparatus of claim 4, wherein the electronic device information DB stores product information including a manufacturer and model name of an electronic device provided in a home, protocol information applied to per-device operation control, and per-device control method information.

6. A remote control method using a camera-based virtual touch, comprising the steps of:
   (A) obtaining a two-dimensional (2D) image of a user's body by a camera and calculating coordinate data indicating positions of first coordinates (an eye) and second coordinates (a finger or pointer) of a user's body on the 2D image of the user's body;
   (B) determining whether the coordinate data indicating the position of the first coordinates of the user's body is substantially identical to the coordinate data indicating the position of the second coordinates of the user's body;
   (C) detecting a variation in the obtained coordinate data of the first and second coordinates to detect the user's motion (gesture) in response to determination that the coordinate data indicating the position of the first coordinates of the user's body is substantially identical to the coordinate data indicating the position of the second coordinates of the user's body; and
   (D) immediately determining that the user has a setting intention to perform a view setting distinctively for the view setting in response to determination that the coordinate data indicating the position of the first coordinates of the user's body substantially identical to the coordinate data indicating the position of the second coordinates of the user's body, wherein the calculated coordinate data is two-dimensional (2D) data and is coordinate data at a position viewed from a camera lens of the camera.

7. A remote control method using a camera-based virtual touch, comprising the steps of:
  (a) obtaining a two-dimensional (2D) image of a user's body by a camera and calculating coordinate data indicating positions of first coordinates (an eye) and second coordinates (a finger or pointer) of a user's body on the 2D image of the user's body;
  (b) determining whether the coordinate data indicating the position of the first coordinates of the user's body is substantially identical to the coordinate data indicating the position of the second coordinates of the user's body;
  (c) detecting a variation in the obtained coordinate data of the first and second coordinates to detect the user's motion (gesture) in response to determination that the coordinate data indicating the position of the first coordinates of the user's body is substantially identical to the coordinate data indicating the position of the second coordinates of the user's body; and
  (d) generating a control command signal for controlling driving of an electronic device based on the detected motion of a finger and sending the control command signal to the electronic device,
  wherein the calculated coordinate data is two-dimensional (2D) data and is coordinate data at a position viewed from a camera lens of the camera.

8. The remote control method of claim 7, wherein step (d) includes the steps of (d1) comparing electronic device information previously stored in an electronic device information database (DB) based on the detected gesture by performing the view setting and a consecutive operation to detect a corresponding electronic device and to set an electronic device to be controlled for operation through a virtual touch, (d2) setting a control signal according to control of driving of the electronic device set through the user's motion (gesture) detected based on the 2D coordinate data, (d3) converting into a control command signal for controlling of driving of the electronic device based or the set control signal and generating a control command code for a corresponding electronic device, and (d) converting the generated command code into a control command signal for controlling operation of the electronic device and sending the control command signal to the electronic device.

9. The remote control method of claim 8, wherein step (d2) includes setting the second coordinates of the user moving in at least one direction of up, down, left, and right with respect to the extension line of the camera lens, the first coordinates, and the second coordinates as a control signal indicating selection or control of a particular icon displayed on a display unit or a motion of a joystick, setting the second coordinates of the user moving along a straight line from left to right (or from right to left) or from down to up (or from up to down) with respect to the extension line of the camera lens, the first coordinates, and the second coordinates as a control signal for controlling a left-to-right turnon/off switch or up-to-down turnon/off switch, and setting the second coordinates of the user moving along a curved line from down to up (or from up to down) with respect to the extension line of the camera lens, the first coordinates, and the second coordinates as a control signal for controlling a degree of rotation for adjusting a magnitude through a rotating wheel.

10. The remote control method of claim 8, wherein the control command signal sent in step (d4) is sent through a short-range wireless communication scheme including an infrared (IR) signal, Wi-Fi, Bluetooth, or Zigbee.

* * * * *